(12) United States Patent
Kayama et al.

(10) Patent No.: US 6,922,309 B2
(45) Date of Patent: Jul. 26, 2005

(54) SPINDLE MOTOR AND INFORMATION RECORDING AND/OR REPRODUCING APPARATUS HAVING THIS SPINDLE MOTOR

(75) Inventors: Shun Kayama, Saitama (JP); Kazuo Goto, Kanagawa (JP); Yutaka Okazaki, Tokyo (JP); Toshio Iwata, Kanagawa (JP)

(73) Assignees: Sony Corporation (JP); CDR Inc. (JP)

( * ) Notice: Subject to any disclaimer, the term of this patent is extended or adjusted under 35 U.S.C. 154(b) by 248 days.

(21) Appl. No.: 10/227,432

(22) Filed: Aug. 26, 2002

(65) Prior Publication Data

US 2003/0048577 A1 Mar. 13, 2003

(30) Foreign Application Priority Data

Aug. 27, 2001 (JP) ..................... P2001-256909

(51) Int. Cl.[7] ........................ G11B 17/02; H02K 7/08; H02K 5/16
(52) U.S. Cl. .................... 360/99.08; 310/67 R; 310/90
(58) Field of Search ..................... 360/99.08, 99.04, 360/98.07; 310/67 R, 90, 107, 112, 292

(56) References Cited

U.S. PATENT DOCUMENTS

| 4,875,110 | A | * | 10/1989 | Kazama et al. ............... 360/64 |
| 4,949,000 | A | * | 8/1990 | Petersen ..................... 310/179 |
| 5,500,780 | A | * | 3/1996 | Boutaghou et al. ....... 360/99.08 |
| 5,670,837 | A | * | 9/1997 | Boutaghou et al. ......... 310/184 |
| 6,674,201 | B2 | * | 1/2004 | Liu et al. ..................... 310/91 |
| 6,680,814 | B2 | * | 1/2004 | Nii et al. ................. 360/99.08 |

* cited by examiner

Primary Examiner—Angel Castro
(74) Attorney, Agent, or Firm—Rader, Fishman & Grauer PLLC; Ronald P. Kananen

(57) ABSTRACT

A spindle motor that can be reduced in size and thickness and yet develops a high rotational torque, and an information recording and/or reproducing apparatus employing this spindle motor. A rotor R includes a turntable 50 which carries and secures a disc-shaped recording medium D and which is rotatable relative to a fixed shaft 66 via a bearing, a ring-shaped first magnet 60 secured to the turntable 50 and arranged inwardly of a coil 68 having the fixed shaft 66 as center, and a ring-shaped second magnet 62 secured to the turntable 50 and arranged outwardly of the coil 68 having the fixed shaft 66 as center. The rotor R is rotated relative to the stator S, by a magnetic field generated in the coil 68 on supplying the current to the coil 68 and another magnetic field generated between the first and second magnets 60 and 62.

6 Claims, 13 Drawing Sheets

SPINDLE MOTOR AND INFORMATION RECORDING AND/OR REPRODUCING APPARATUS HAVING THIS SPINDLE MOTOR

BACKGROUND OF THE INVENTION

1. Field of the Invention

This invention relates to a spindle motor and an information recording and/or reproducing apparatus having this spindle, motor.

2. Description of Related Art

An information recording and/or reproducing apparatus, such as a hard disc drive device, has been extended in its application, such that it is now being used not only as a large-sized recording device or a recording device, dedicated to a desk-top personal computer, but also in a notebook computer or an electronic equipment smaller in size than the notebook computer, such as a portable terminal device.

Recently, an IC (Integrated Circuit) memory card, termed a PC (personal computer) card size, or a hard disc drive device of a PC card type of approximately the size of a card type modem is in use. This PC card type hard disc drive device is used as necessary by being inserted into or extracted from a PC card slot of a notebook personal computer or a portable terminal device by a user.

FIGS. 12 and 13 show the structure of a motor used in a conventional hard disc drive device.

The motor of FIG. 12 includes a rotor 1000 and a stator 1001, of which the rotor 1000 includes a disc-shaped recording medium D. The rotor 1000 is mounted for rotation by two sets of ball bearings 1003, 1004 to a shaft 1002 of the stator 1001.

In the motor structure of FIG. 13, the rotor 1010 includes the disc-shaped recording medium D, and it is mounted for rotation by two sets of ball bearings 1013, 1014 to a shaft 1012 of a stator 1011.

This type of the motor of the conventional structure suffers the following problems.

With the motor of FIG. 12, the ball bearings 1013, 1014 are arranged side-by-side along the axis of the shaft 1002 (in the thrust direction), and hence the axial thickness E1 of the motor cannot be diminished. In a similar manner, in the structure of the motor of FIG. 13, since the ball bearings 1013, 1014 are arranged along the axial direction, the thickness E2 along the axis of the motor also is increased.

For this reason, it is difficult to reduce the thickness E1 or the thickness E2 of the motor. Moreover, in the above-described two motor structures, in which two sets of ball bearings are arranged in the thrust direction, problems are raised as to the shock-proofness on application of a shock from outside, with the consequence that troubles tend to be produced in the operation of recording or reproducing the information for a disc-shaped recording medium.

SUMMARY OF THE INVENTION

It is therefore an object of the present invention to overcome the above difficulties of the conventional art and to provide a spindle motor that can be reduced in thickness and size and which is able to develop a high rotational torque and an information recording and/or reproducing apparatus having such a spindle motor.

In one aspect, the present invention provides a spindle motor having a stator and a rotor carrying a disc-shaped recording medium thereon and adapted for being rotated relative to the stator, in which the stator includes a stator plate, a fixed shaft secured to the stator plate, a bearing secured to the fixed shaft and a coil secured to the stator plate about the fixed shaft as center, and in which the rotor includes a turntable carrying and securing the disc-shaped recording medium and adapted for being rotated relative to the fixed shaft via the bearing, a ring-shaped first magnet secured to the turntable and positioned inwardly of the coil about the fixed shaft as center and a ring-shaped second magnet secured to the turntable and positioned outwardly of the coil about the fixed shaft as center. The rotor is rotated relative to the stator about the fixed shaft as center by a magnetic field generated in the coil on supplying the current to the coil and a magnetic field produced between the first and second magnets.

The fixed shaft of the stator is secured to the stator plate, while the bearing is secured to the fixed shaft. The coil is secured to the stator with the fixed shaft as center.

The turntable of the rotor mounts and secures a disc-shaped recording medium and is rotatable via a bearing with respect to the fixed shaft. The first magnet of the rotor is secured to the turntable and is positioned inwardly of the coil having the fixed shaft as center. The second magnet of the rotor is secured to the turntable and is positioned outwardly of the coil having the fixed shaft as center.

As the current conduction unit supplies the current to the coil, a magnetic field is produced in the coil. The rotor is rotated relative to the stator, about the fixed shaft as the center, by the so-produced magnetic field and by another magnetic field generated across the first and second magnets.

Since the rotor is rotated relative to the stator by the magnetic field generated between the first and second magnets and the magnetic field generated in the coil, a rotational torque higher than if a sole magnet is used can be produced.

Moreover, the ring-shaped first magnet and the ring-shaped second magnet are arranged inwardly and outwardly of the coil, with the fixed shaft as center, such that the first and second magnets and the coil are in a peripherally-facing relationship to one another. This enables the high rotational torque to be developed, as described above, without the necessity of increasing the axial length of the fixed shaft. On the other hand, a high rotational torque can be developed as the axial size or thickness of the spindle motor is diminished.

Preferably, the bearing includes a first sleeve secured to the outer peripheral surface of the fixed shaft, a first flange secured to one end of the first sleeve, a second flange secured to the opposite end of the first sleeve and a second sleeve securing the first magnet to the turntable and kept in contact with the first sleeve, the first flange and the second flange.

Preferably, herringbone grooves are formed in a surface of the first sleeve contacting with the second sleeve, a surface of the first flange contacting with the second sleeve and a surface of the second flange contacting with the second sleeve, and oil is applied to a space between the second sleeve and the surface of the first sleeve and a space between the surface of the first flange and the surface of the second flange.

The provision of the herringbone grooves helps improve the rotation of the rotor relative to the stator via bearing by dynamic pressures generated on rotor rotation.

Since the dynamic pressure is used as the bearing, it is possible to improve rotational accuracy, durability, noise reduction and shock proofness.

Preferably, oil-scattering prohibiting means is formed in a gap between the first flange and the second sleeve and in a gap between the second flange and the second sleeve.

The provision of the oil-scattering prohibiting means helps prevent the oil lying in this bearing from being scattered towards the disc-shaped recording medium.

In another aspect, the present invention provides an information recording and/or reproducing apparatus including a spindle motor having a stator and a rotor carrying a disc-shaped recording medium thereon and adapted for being rotated relative to the stator with respect to the stator, in which the stator of the spindle motor includes a stator plate, a fixed shaft secured to the stator plate, a bearing secured to the stator plate and a coil secured to the stator plate about the fixed shaft as center, and in which the rotor of the spindle motor includes a turntable carrying and securing the disc-shaped recording medium and adapted for being rotated relative to the fixed shaft via the bearing, a ring-shaped first magnet secured to the turntable and positioned inwardly of the coil about the fixed shaft as center, and a ring-shaped second magnet secured to the turntable and positioned outwardly of the coil about the fixed shaft as center. The rotor is rotated relative to the stator about the fixed shaft as center by a magnetic field generated in the coil on supplying the current to the coil and a magnetic field produced between the first and second magnets.

The fixed shaft of the stator is secured to the stator plate, while the bearing is secured to the fixed shaft. The coil is secured to the stator with the fixed shaft as center.

The turntable of the rotor mounts and secures a disc-shaped recording medium and is rotatable via a bearing with respect to the fixed shaft. The first magnet of the rotor is secured to the turntable and is positioned inwardly of the coil having the fixed shaft as center. The second magnet of the rotor is secured to the turntable and is positioned outwardly of the coil having the fixed shaft as center.

As the current conduction unit supplies the current to the coil, a magnetic field is produced in the coil. The rotor is rotated relative to the stator, about the fixed shaft as the center, by the so-produced magnetic field and another magnetic field generated across the first and second magnets.

Since the rotor is rotated relative to the stator by the magnetic field generated between the first and second magnets and by the magnetic field generated in the coil, a rotational torque can be produced which is higher than if a sole magnet is used.

Moreover, the ring-shaped first magnet and the ring-shaped second magnet are arranged inwardly and outwardly of the coil, respectively, with the fixed shaft as center, such that the first and second magnets and the coil are in a peripherally-facing relationship to one another. This enables the high rotational torque to be produced, as described above, without the necessity of increasing the axial length of the fixed shaft. On the other hand, a high rotational torque can be produced as the axial size or thickness of the spindle motor is diminished.

Preferably, the bearing includes a first sleeve secured to the outer peripheral surface of the fixed shaft, a first flange secured to one end of the first sleeve, a second flange secured to the opposite end of the first sleeve and a second sleeve securing the first magnet to the turntable and kept in contact with the first sleeve, the first flange and the second flange.

Preferably, herringbone grooves are formed in a surface of the first sleeve contacting with the second sleeve, a surface of the first flange contacting with the second sleeve and a surface of the second flange contacting with the second sleeve, and oil is applied to a space between the surfaces of the second sleeve and the first sleeve and a space between the surface of the first flange and the surface of the second flange.

The provision of the herringbone grooves helps improve the rotation of the rotor relative to the stator via bearing by dynamic pressures generated on rotor rotation.

Since the dynamic pressure is used as a bearing, it is possible to improve rotational accuracy, durability, noise reduction and shock proofness.

Preferably, the oil-scattering prohibiting means is formed in a gap between the first flange and the second sleeve and in a gap between the second flange and the second sleeve.

The provision of the oil-scattering prohibiting means is effective to prevent the oil present in the bearing from being scattered towards the disc-shaped recording medium.

Preferably, the stator is secured within a casing of the apparatus and the stator plate forms an integral portion of the casing of the apparatus.

Since the stator plate of the stator forms an integral portion of the casing of the information recording and/or reproducing apparatus, it is possible to reduce the number of component parts to reduce the size of the information recording and/or reproducing apparatus.

Also, preferably, the disc-shaped recording medium is a hard disc.

According to the present invention, as described above, it is possible to reduce the size and thickness of the spindle motor or the information recording and/or reproducing apparatus, and to develop a high rotational torque.

DESCRIPTION OF THE PREFERRED EMBODIMENTS

Figure 1:
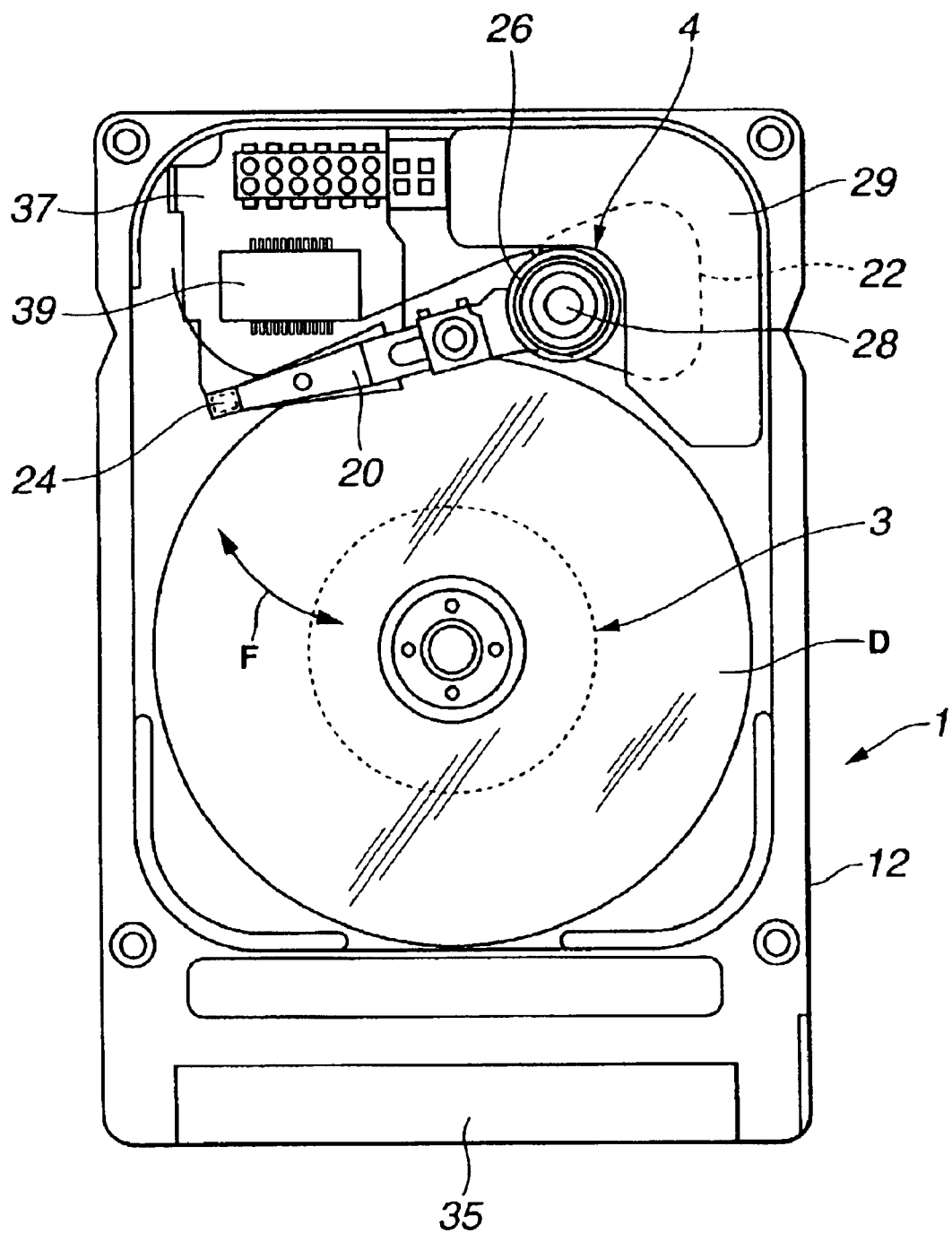
FIG. 1 is a plan view showing the inside of a hard disc drive device as an example of a information recording and/or reproducing apparatus having a spindle motor of the present invention.

Referring to the drawings, preferred embodiments of the present invention will be explained in detail.

In the embodiments that follow, various technically desirable limitations are imposed, since these embodiments represent preferred embodiments of the invention. It should be noted that the present invention is not to be limited to these embodiments, as now explained, except if there are made specific limiting statements.

Figure 2:
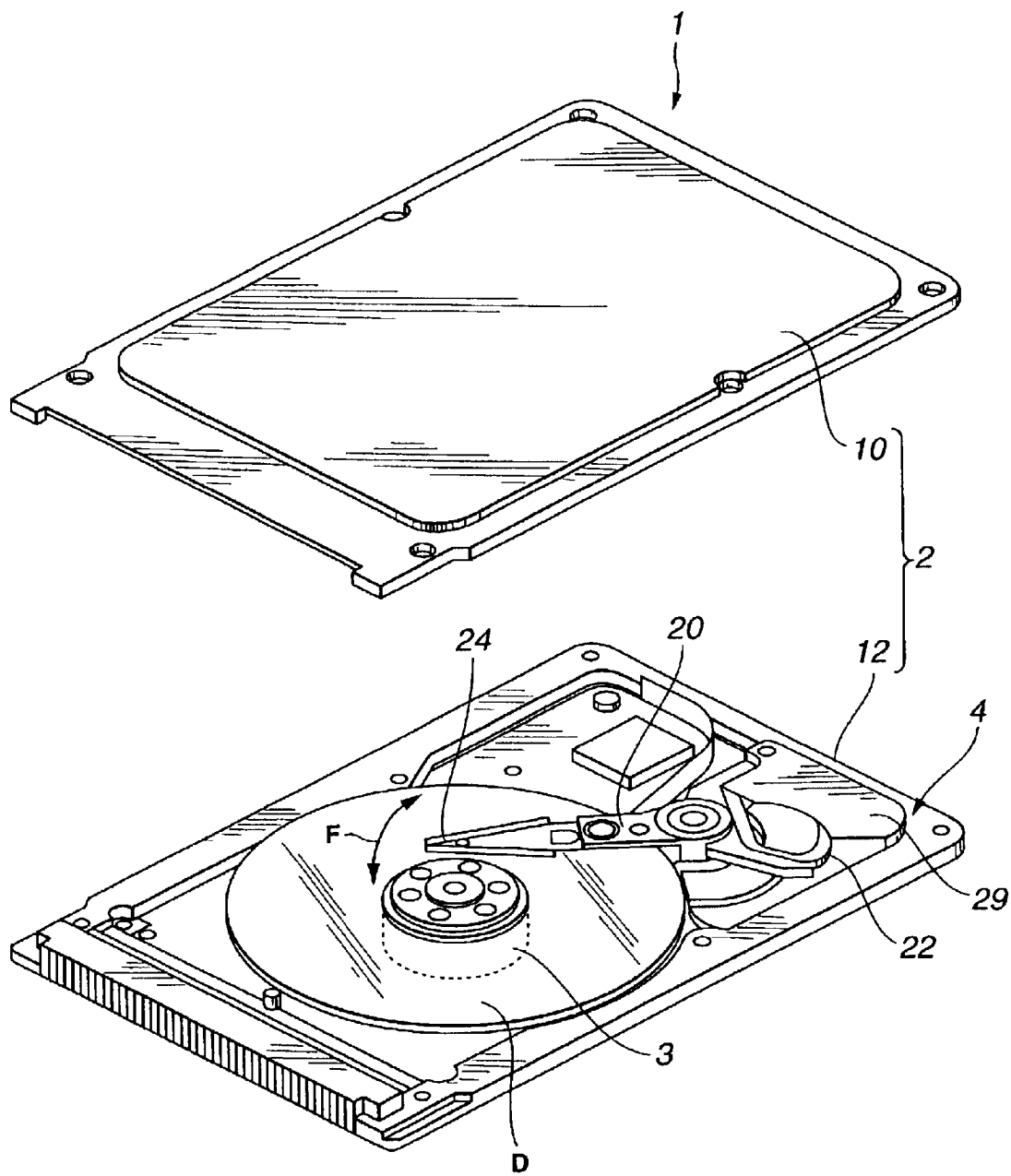
FIG. 2 is an exploded perspective view showing the hard disc drive device including the hard disc of FIG. 1.
Figure 3:
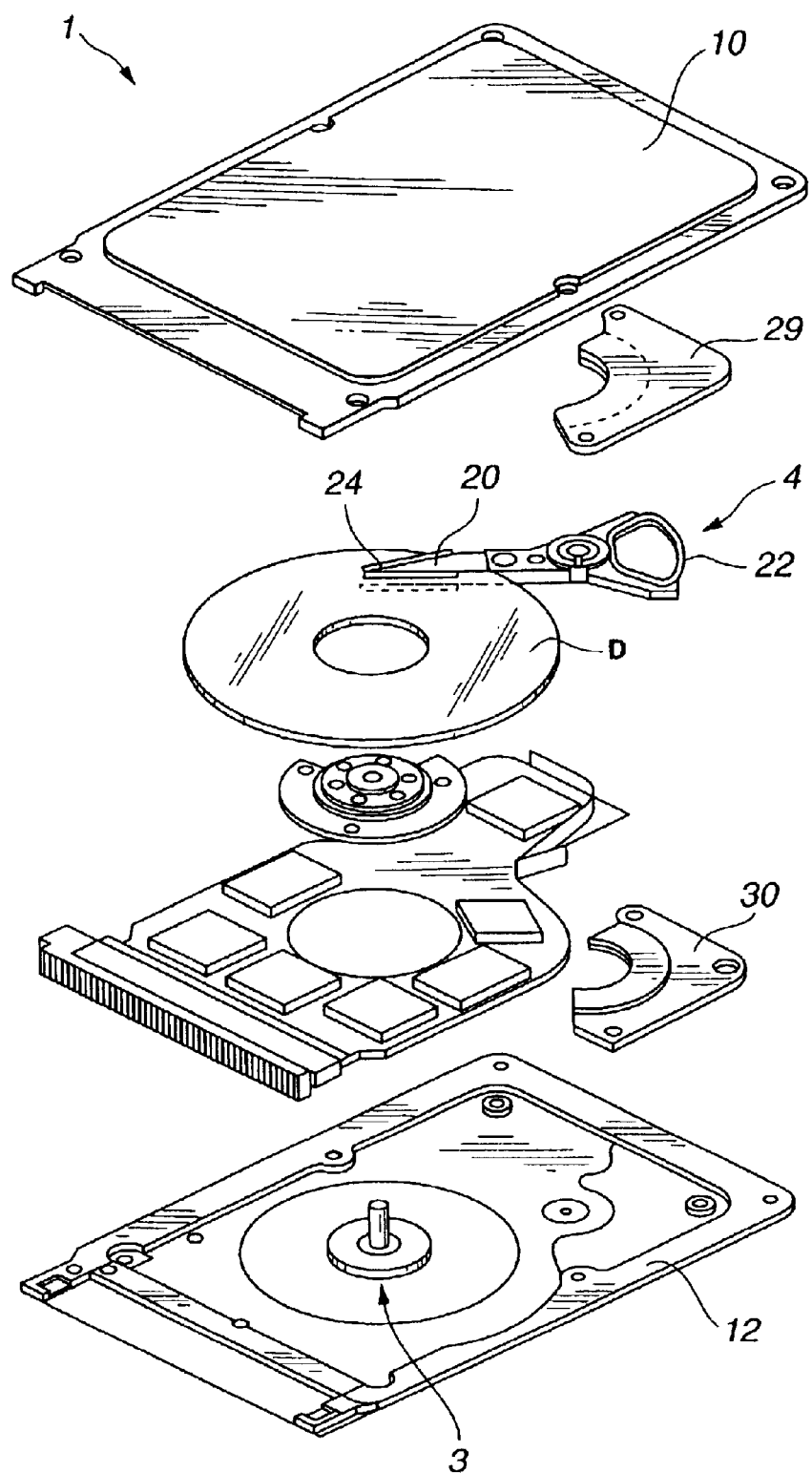
FIG. 3 is a further exploded view of the hard disc drive device shown in FIG. 2.
Figure 4:
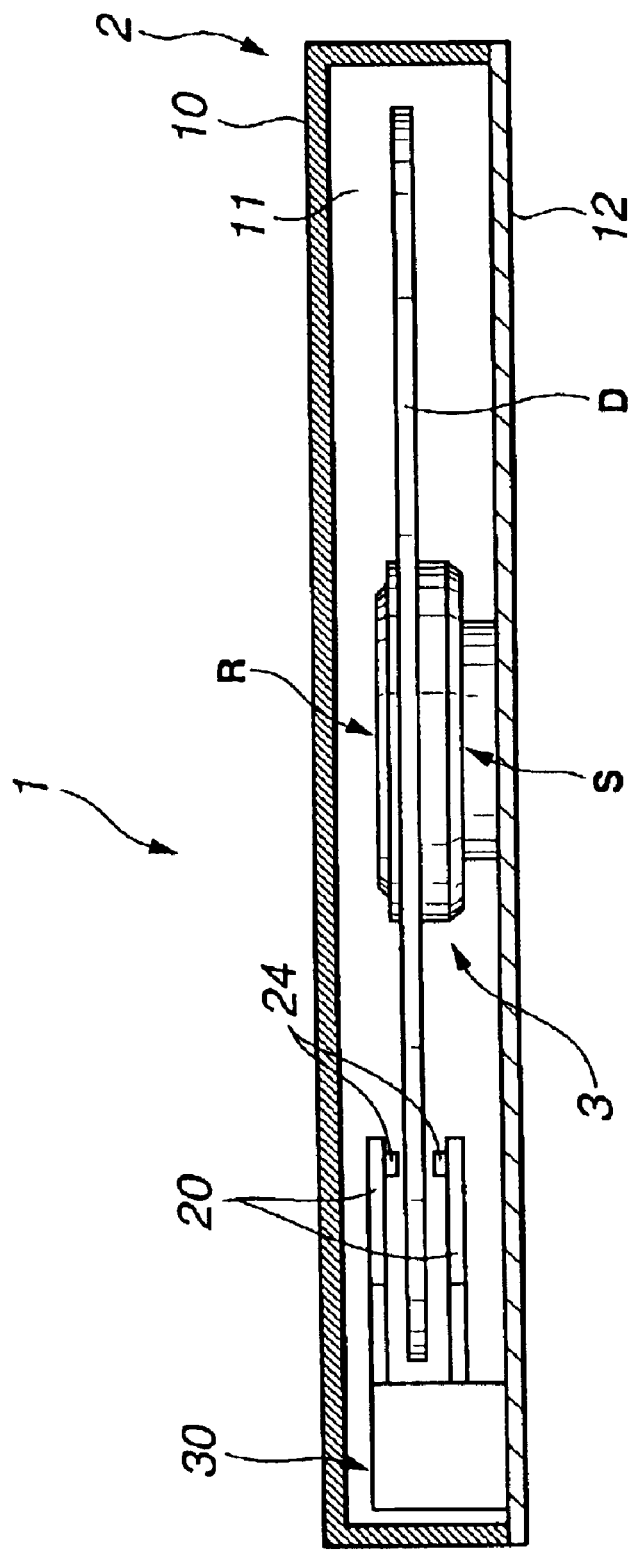
FIG. 4 shows an exemplary cross-sectional structure of the hard disc drive device shown in FIGS. 1 to 3.

FIG. 1 is a plan view showing the inside of a hard disc drive device as an example of an information recording and/or reproducing apparatus having a spindle motor of the present invention. FIGS. 2 and 3 are exploded perspective views showing the information recording and/or reproducing apparatus shown in FIG. 1. FIG. 4 shows an illustrative cross-sectional structure of the information recording and/or reproducing apparatus shown in FIGS. 1 to 3.

The information recording and/or reproducing apparatus shown in FIGS. 1 to 4 is a hard disc drive device, as an example. This hard disc drive device 1 has the function of magnetically recording the information on the disc-shaped recording medium D or reproducing the information already recorded on the disc-shaped recording medium D.

This hard disc drive device 1 is used as it is loaded in a PC card slot of a so-called notebook computer, as a sort of electronic equipment, and hence is a device of extremely small size and thickness.

The hard disc drive device 1 includes a casing (outer casing) 2, a disc-shaped recording medium D, a spindle motor 3 and a rotational actuator 4, as shown schematically in FIGS. 2 and 3. The casing 2 includes a first member (upper casing member) 10 and a second member (lower casing member) 12. The first and second members 10, 12 define an inner spacing 11, as shown for example in FIG. 4. Within this spacing 11, there are housed, e.g., the spindle motor 3, the disc-shaped recording medium D and the rotational actuator 4.

The first and second members 10, 12 are formed of a magnetically permeable material in the form of, for example, silicon steel plates or iron plates for constituting a magnetic circuit of the spindle motor 3.

The disc-shaped recording medium D is secured to a rotor R of the spindle motor 3, as shown in FIG. 4. The rotor R causes continuous rotation of the disc-shaped recording medium D.

Referring to FIG. 1, the rotational actuator 4 includes a suspension 20, a voice coil 22 and two magnetic heads 24, 24. The suspension 20 has a base 26 mounted on a shaft 28, which shaft 28 is carried for rotation with respect to the inner surface of the second member 12.

The magnetic heads 24, 24 of the rotational actuator may be moved in the direction indicated by arrow F in FIGS. 1 and 2, under an electromagnetic force generated between the voice coil 22 and the magnets 29, 30 shown in FIG. 3. The magnetic heads 24, 24 may be positioned with respect to an optional track of the rotating disc-shaped recording medium D for magnetically recording information signals or magnetically reproducing the information already recorded thereon. The magnetic head 24 may, for example, be a GMR (giant magnetoresistance effect device).

The hard disc drive device 1 shown in FIG. 1 is shown in a state in which the first member 10 of the casing 2 has been removed from its second member 12, in order to make the inner members, such as the disc-shaped recording medium D or the rotational actuator 4, visible from outside. One end of the second member 12 is provided with a connection terminal 35 for establishing electrical connection to, e.g., a computer.

Referring to FIG. 1, the circuit board 37 is arranged in the spacing 11, such as to clear the disc-shaped recording medium D. On this circuit board 37, there are mounted routine electronic components, such as a system LSI (large-scale integrated circuit) 39 or an IC (integrated circuit).

The structure of the spindle motor 3 is now explained.

Referring to FIG. 4, the spindle motor 3 is arranged within the casing 2. In particular, the stator S of the spindle motor 3 is secured to the inner surface of the second member 12. Referring to FIG. 4, the spindle motor 3 includes the rotor R and the stator S.

Figure 5:
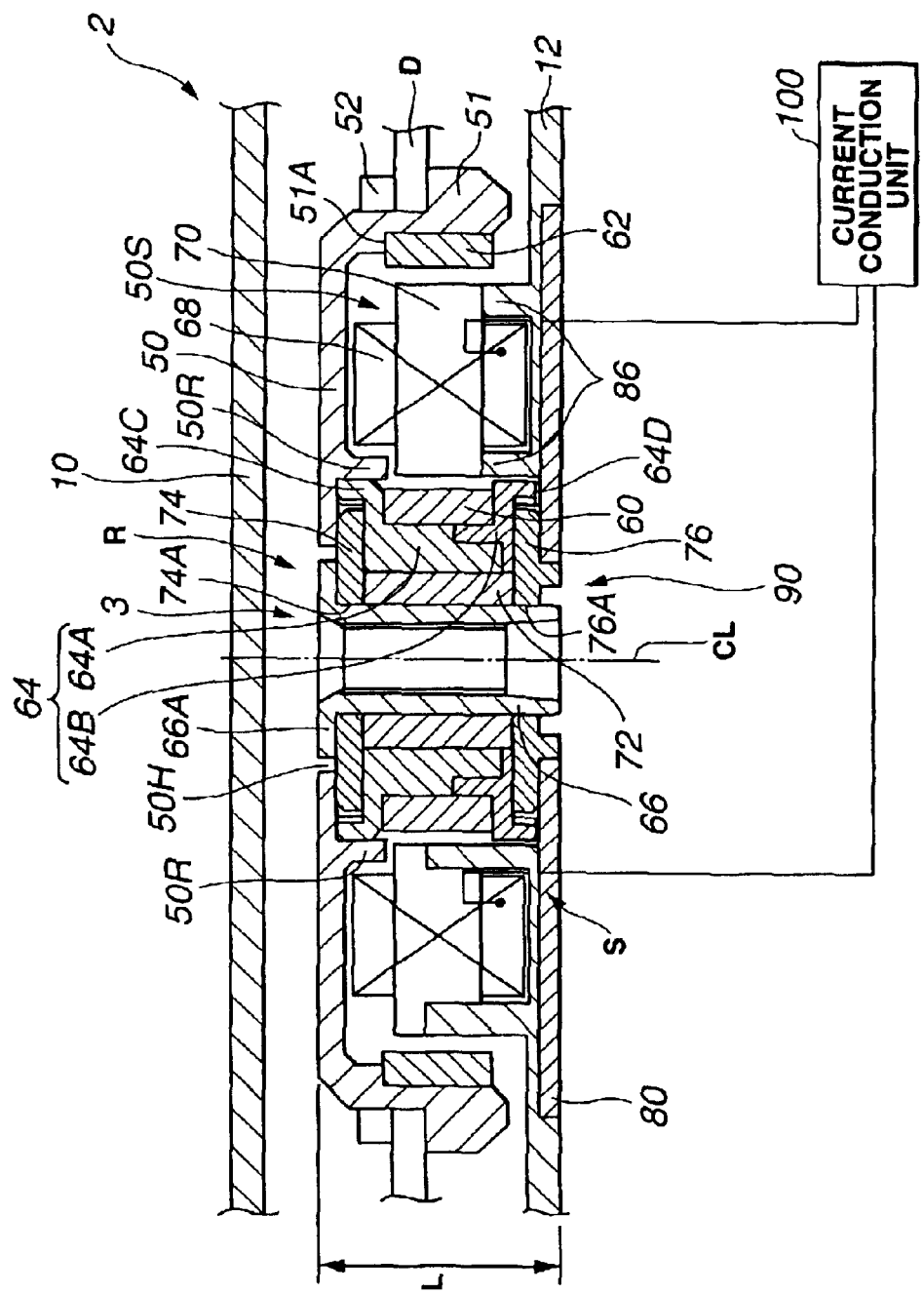
FIG. 5 shows an exemplary cross-sectional structure of a spindle motor shown in FIG. 4.

FIG. 5 shows an illustrative cross-sectional structure of the spindle motor 3 of FIG. 4.

First, the structure of the rotor R of the spindle motor 3 is explained.

The rotor R is roughly made up by a turntable 50, a chuck 52, a ring-shaped first magnet 60, a ring-shaped second magnet 62 and a second sleeve 64.

The rotor R may be rotated relative to a stationary shaft 66 of the stator S, with the interposition of a bearing 90, as later explained, about an axis of rotation CL as the center of rotation. The turntable 50 is formed for example of stainless steel, such as SUS430F. The turntable 50 includes a hub 51 on its entire rim for securing the disc-shaped recording medium D thereto. This hub 51 is formed to a substantially L-shaped cross-sectional shape along the rim of the turntable 50.

The turntable 50 includes a circular center hole 50H. The turntable 50, also termed a rotor yoke, is substantially U- or cup-shaped when seen in the cross-sectional view of FIG. 5. A rib 50R is formed on the entire rim of the hole 50H.

The first magnet 60 and the second magnet 62 for driving the rotor R with respect to the stator S are positioned facing each other in an internal spacing 50S of the turntable 50.

Figure 6:
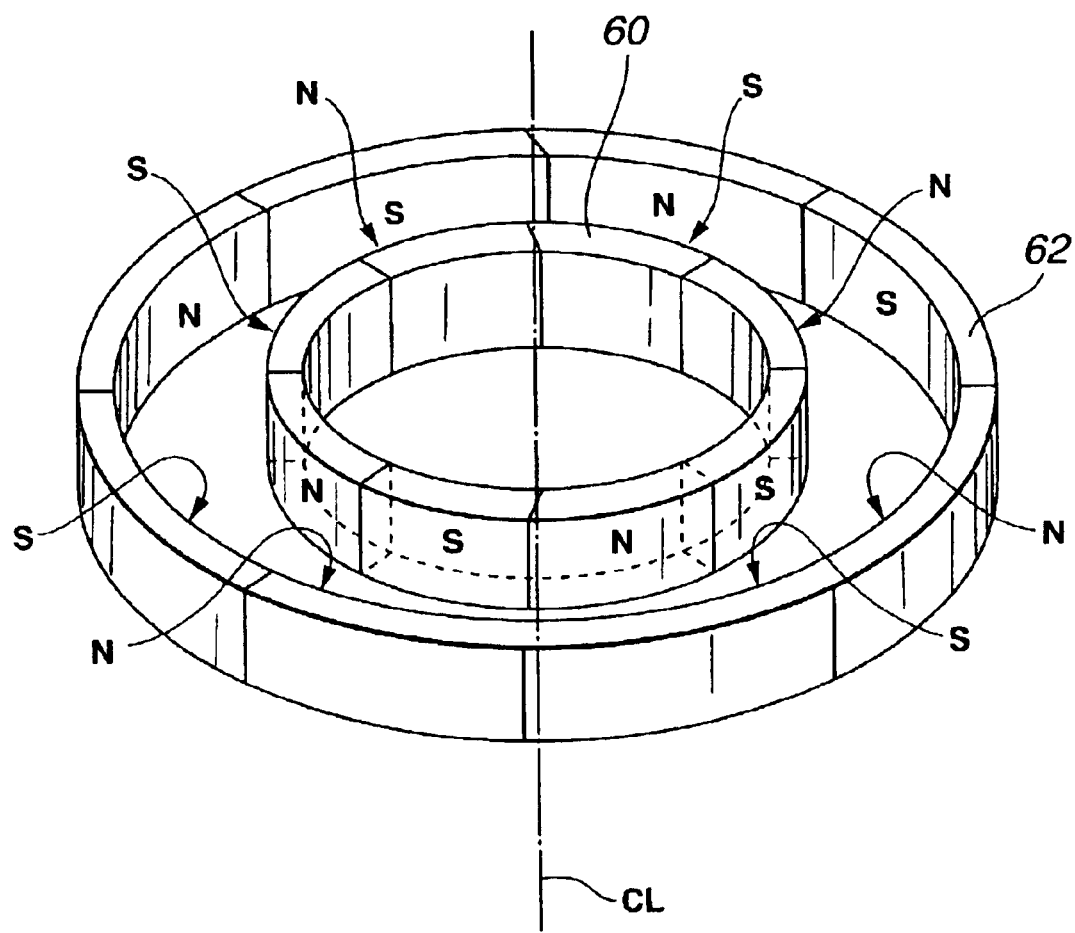
FIG. 6 is a perspective view showing first and second magnets.

FIG. 6 shows the first magnet 60 and the second magnet 62. The first magnet 60 includes a sum total of eight poles, specifically four S poles and four N poles, arranged alternately along the circumferential direction. Similarly, the second magnet 62 includes a sum total of eight poles, specifically four S poles and four N poles, arranged alternately along the circumferential direction. If the first magnet 60 is an S pole, the portion of the second magnet 62 facing this S pole is an N pole. Facing an N pole of the first magnet 60 is an S pole of the second magnet 62.

The diameter of the ring-shaped first magnet 60 is set so as to be smaller than the diameter of the ring-shaped second magnet 62.

Referring to FIG. 5, a coil 68 and a core 70 on the stator S side are positioned between the first and second magnets 60 and 62. That is, the first and second magnets 60 and 62 are of a peripherally-facing structure. Moreover, the first and second magnets 60 and 62 are arranged in a peripherally-facing relationship with respect to the coil 68, with the coil 68 and the core 70 in-between.

The first and second magnets 60 and 62 may for example be rubber magnets, magnets of a synthetic material or magnets of a sintered magnetic material.

The magnetic material used may be ferrite, neodymium or samarium cobalt having a large saturation magnetization, a significant anisotropy and a large energy product.

Referring to FIG. 6, the first and second magnets 60 and 62 are arranged concentrically, with the center axis CL as center.

The inner first magnet 60 is secured to a first sleeve portion 64A and to a second sleeve portion 64B of the second sleeve 64 in an embraced fashion. The first magnet 60 may be unified and secured to the second sleeve 64, such as by press-fitting or adhesion, while the second magnet 62 may be secured to an inner step 51A of the hub 51, such as by adhesion or press-fitting.

The second sleeve 64 of FIG. 5 includes the sleeve portion 64A and the sleeve portion 64B. These sleeve portions 64A, 64B are formed of, for example, stainless steel, for example, SUS440C. The sleeve portions 64A, 64B immobilize the outer periphery and the upper and lower surfaces of the first magnet 60. In addition, the sleeve portion 64A has its site 64C secured to the inner side of the rib 50R of the turntable 50 such as by press-fitting or adhesion. The site 64C of the sleeve portion 64A is protruded upwards along the center axis CL. The sleeve portion 64A also has its site 64D protruded downwards along the center axis CL.

The disc-shaped recording medium D is loaded on the hub 51 of the turntable 50 shown in FIG. 5. This disc-shaped recording medium D is secured by a chuck 52 to the hub 51 against inadvertent removal. This chuck 52 may be secured by screws, press-fitting, adhesion or welding to the hub 51 of the turntable 50.

The structure of the stator S of the spindle motor 3 of FIG. 5 is hereinafter explained.

The stator S is roughly made up by a stationary shaft 66, a coil 68, a core 70, a first sleeve 72, a first flange 74, a second flange 76 and a stator plate 80, as shown in FIG. 5. The stator plate 80 forms an integral portion of the second member 12 of the casing 2 shown in FIG. 4. The stator plate 80 is formed, e.g., as an iron plate or a silicon steel plate.

Figure 7:
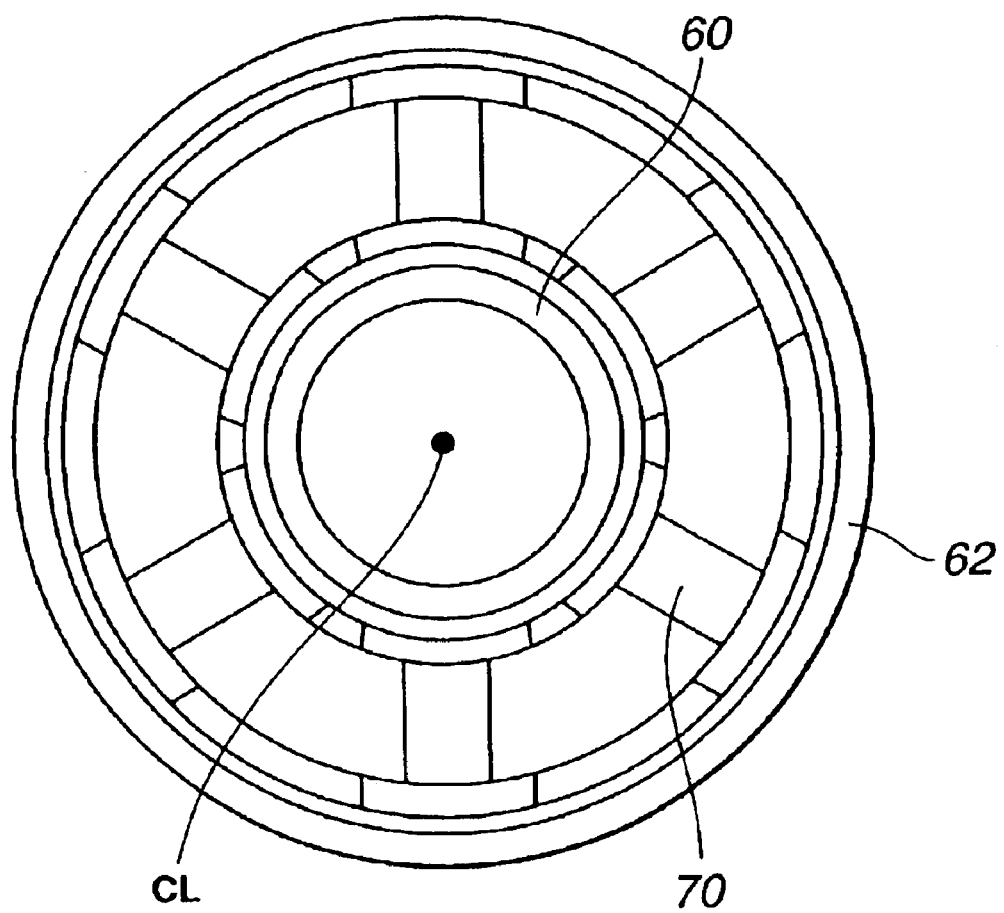
FIG. 7 is a plan view showing first and second magnets and a core.
Figure 8:
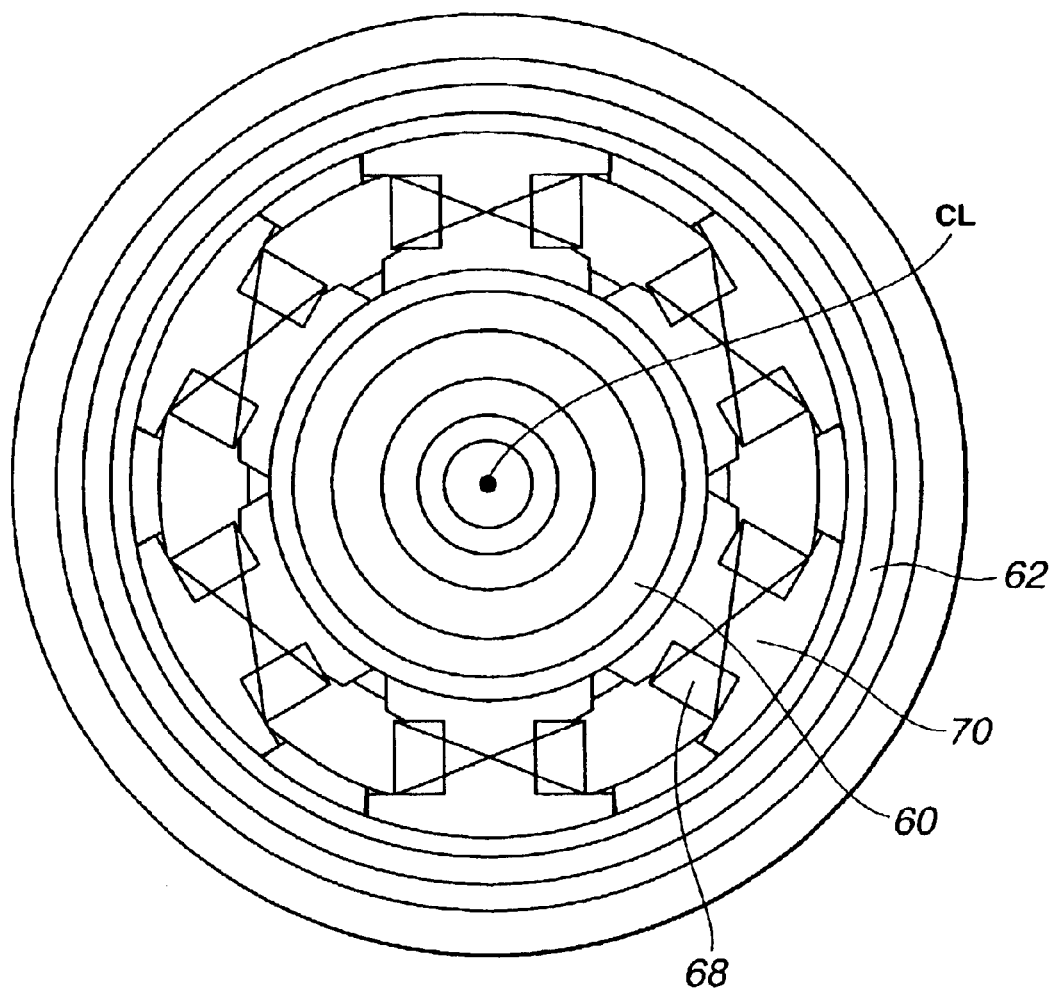
FIG. 8 is a plan view showing the first and second magnets, the core and a coil.

The core 70 is formed by stacking plural silicon steel plates together. The coil 68 is wound a preset number of turns on the core 70. The coil is arranged with a preset gap between and in a peripherally-facing relationship to the first magnet 60 and the second magnet 62. FIG. 7 is a plan view showing the core 70, first magnet 60 and the second magnet 62. FIG. 8 is a plan view showing the first magnet 60, the second magnet 62, the core 70 and the coil 68. Six coil-core sets 68–70 are arranged at equiangular intervals along the circumference about the center axis CL as center.

The core 70, shown in FIG. 5, is secured to a mounting portion 86 of the second member 12 of the casing 2. That is, the core 70 is secured as one to the second member 12.

The stator plate 80 and the second member 12 may be an iron or silicon-steel plate. Alternatively, it may be formed of other metals or synthetic resin.

A fixed shaft 66 is a cylindrical member carrying a flange 66A at its upper end portion. The fixed shaft 66 is formed, e.g., of stainless steel, for example, SUS303.

The first sleeve 72 is a cylindrical member formed, e.g., of stainless steel, such as SUS440C. The first sleeve 72 has its inner peripheral surface secured, to the outer peripheral surface of the fixed shaft 66, such as by press-fitting.

The first flange 74 and the second flange 76 are ring-shaped members. The outer peripheral surface of the fixed shaft 66 is secured, such as by press-fitting, to a hole 74A formed in the first flange 74. In similar manner, the outer peripheral surface of the fixed shaft 66 is secured, such as by press-fitting, to a hole 76A formed in the second flange 76. The first flange 74 is in tight contact with the inner surface of the flange 66A of the fixed shaft 66. The second flange 76 is located at the lower end of the fixed shaft 66. The second flange 76 includes a protuberance secured to a hole in the stator plate 80 by press-fitting.

The bearing 90 shown in FIG. 5 is now explained.

This bearing 90 is provided for rotating the rotor R about the fixed shaft 66 of the stator S as center of rotation.

Figure 9:
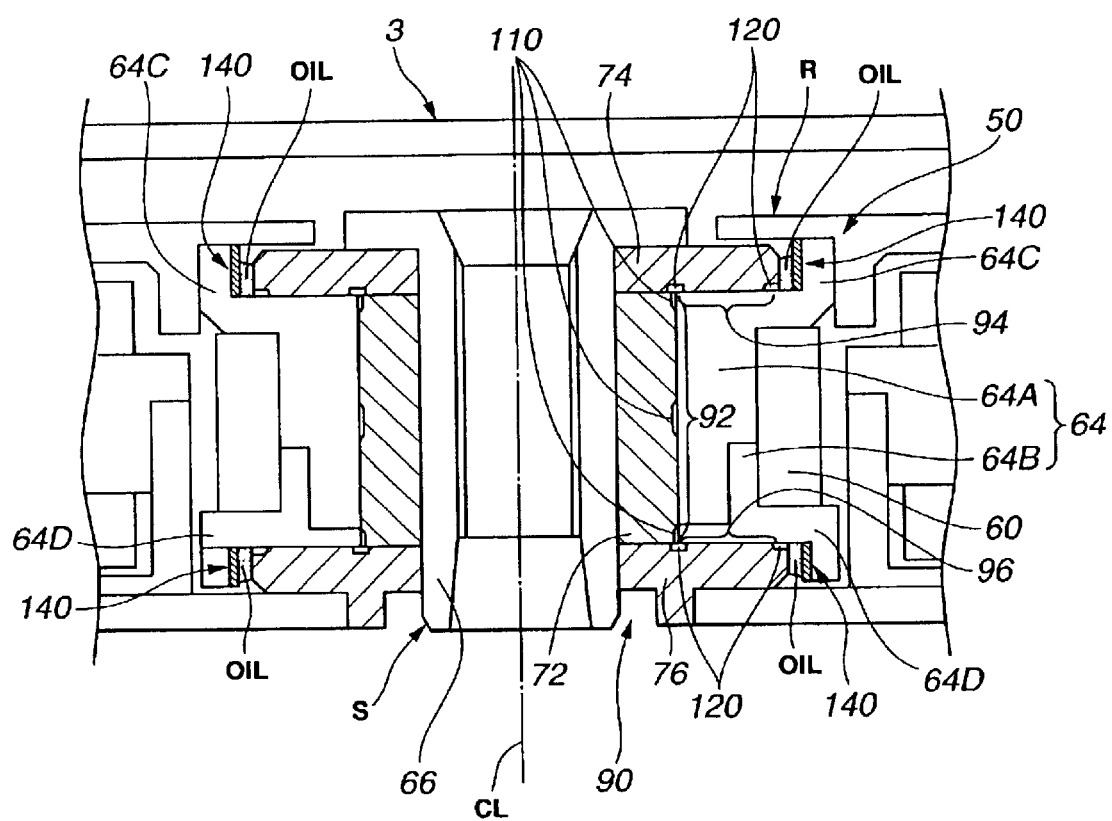
FIG. 9 is an enlarged cross-sectional view showing a center portion of the spindle motor of FIG. 8.

The bearing 90 is shown to an enlarged scale in FIG. 9. Specifically, the bearing 90 is made up by an assembly unit, comprised of the first sleeve 72, the first flange 74 and the second flange 76 on the stator S side and by a unit of the second sleeve 64 on the rotor R side.

In FIG. 9, herringbone grooves 110, 120 are formed in an outer peripheral surface 92 of the first sleeve 72, an inner peripheral surface 94 of the first flange 74 and an inner peripheral surface 96 of the second flange 76. That is, the herringbone groove 110 is formed in the outer peripheral surface 92 of the first sleeve 72, while the herringbone groove 120 is formed in each of the inner peripheral surface 94 of the first flange 74 and the inner peripheral surface 96 of the second flange 76.

Figure 10:
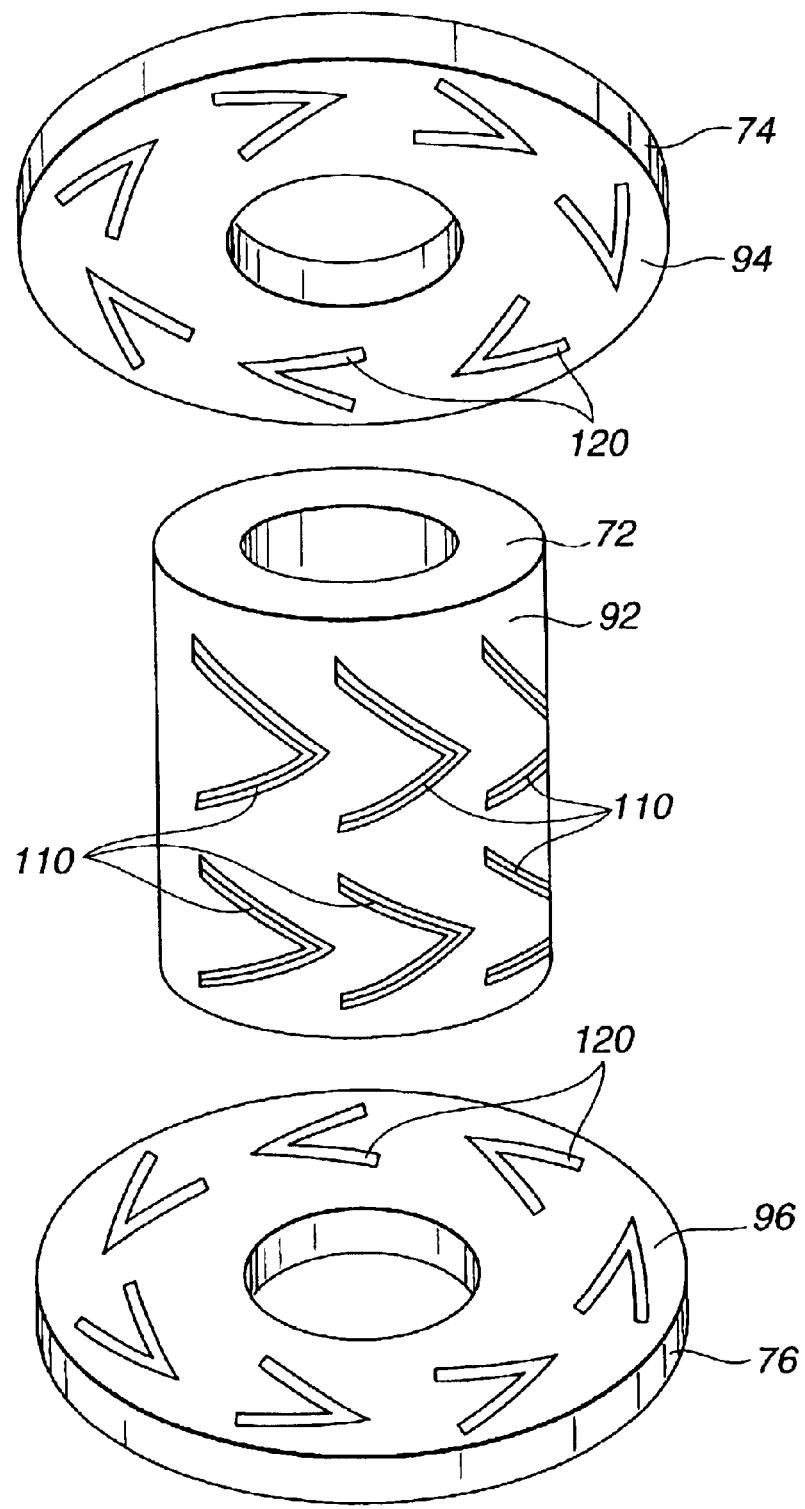
FIG. 10 is a perspective view showing an example of herringbone grooves in a first sleeve and a second flange.

FIG. 10 shows an example of the herringbone groove 110 formed in the outer peripheral surface 92 of the first sleeve 72 and shows examples of the herringbone groves 120 formed in the inner surfaces 94, 96 of the first and second flanges 74, 76, respectively. The herringbone groove 110 is formed along the R direction, while each herringbone groove 120 is formed along the thrusting direction.

The lubricating oil is charged over the outer peripheral surface 92 of the first sleeve 72 and over the inner peripheral surfaces 94, 96 of the first and second flanges 74, 76. Thus, if the rotor R is rotated relative to the stator S, the sleeve portions 64A, 64B of the second sleeve 64 are rotated about the center axis CL as the center of rotation, whereby dynamic pressures can be generated by the sleeve portions 64A, 64B on the first sleeve 72 and on the first and second flanges 74, 76 on the stator S side, with the aid of the herringbone grooves. That is, the bearing 90 is of the dynamic fluid pressure bearing configuration.

The first sleeve 72, the second sleeve 64, the first flange 74 and the second flange 76 may be formed of, for example, bronze, stainless steel or steel-based sintered metal.

Meanwhile, since oil has been charged on the outer peripheral surface 92 and the inner peripheral surfaces 94, 96, it is necessary to prevent this oil OIL from being scattered to outside from the inner space of the bearing 96 to become affixed to the disc-shaped recording medium D when the rotor R is rotated relative to the stator S.

To this end, an oil-scattering prohibiting means 140 is provided, as shown in FIG. 9. This oil-scattering prohibiting means 140 is provided on the inner peripheral surface of the site 64C of the sleeve portion 64A and the inner peripheral surface of the site 64D of the sleeve portion 64B. The oil scattering prohibiting means 140 may, for example, be a fluorine coating.

By so doing, the oil OIL, tending to be leaked from the space between the first flange 74 and the turntable 50 and from the space between the second flange 76 and the turntable 50 during rotation of the rotor R, is repelled by the oil-scattering prohibiting means 140, such as the fluorine coating, so that the oil OIL is not scattered to outside from the spacing between the outer periphery of the first flange 74 and the site 64C, as shown in FIG. 9. In a similar manner, the oil OIL is prevented from being scattered to outside from the spacing between the outer periphery of the second flange 76 and the site 64D. In this manner, no oil is scattered to outside from within the bearing 90 preventing the trouble of oil becoming affixed to, e.g., the disc-shaped recording medium D.

Referring to FIG. 5, each coil 68 is electrically connected to a current conduction unit 100. This current conduction unit 100 feeds the current to the coils 68 in a preset current conduction pattern, so that, under the interaction between the magnetic field generated by the coil 68 and the magnetic field generated between the first and second magnets 60, 62, the disc-shaped recording medium D is rotated continuously, along with the rotor R, about the fixed shaft 66 as the center of rotation.

It should be noted that the rotational actuator 4 shown in FIG. 1 performs a swinging movement to cause the magnetic head 24 of a suspension 20 to record or reproduce the information in a state of having no direct contact with one or the other surface of the disc-shaped recording medium D.

It is of course possible for the magnetic head 24 to make a magnetic recording and/or a reproduction of the information, as the magnetic head 24 has direct contact with one or the other surface of the disc-shaped recording medium D.

Figure 11:
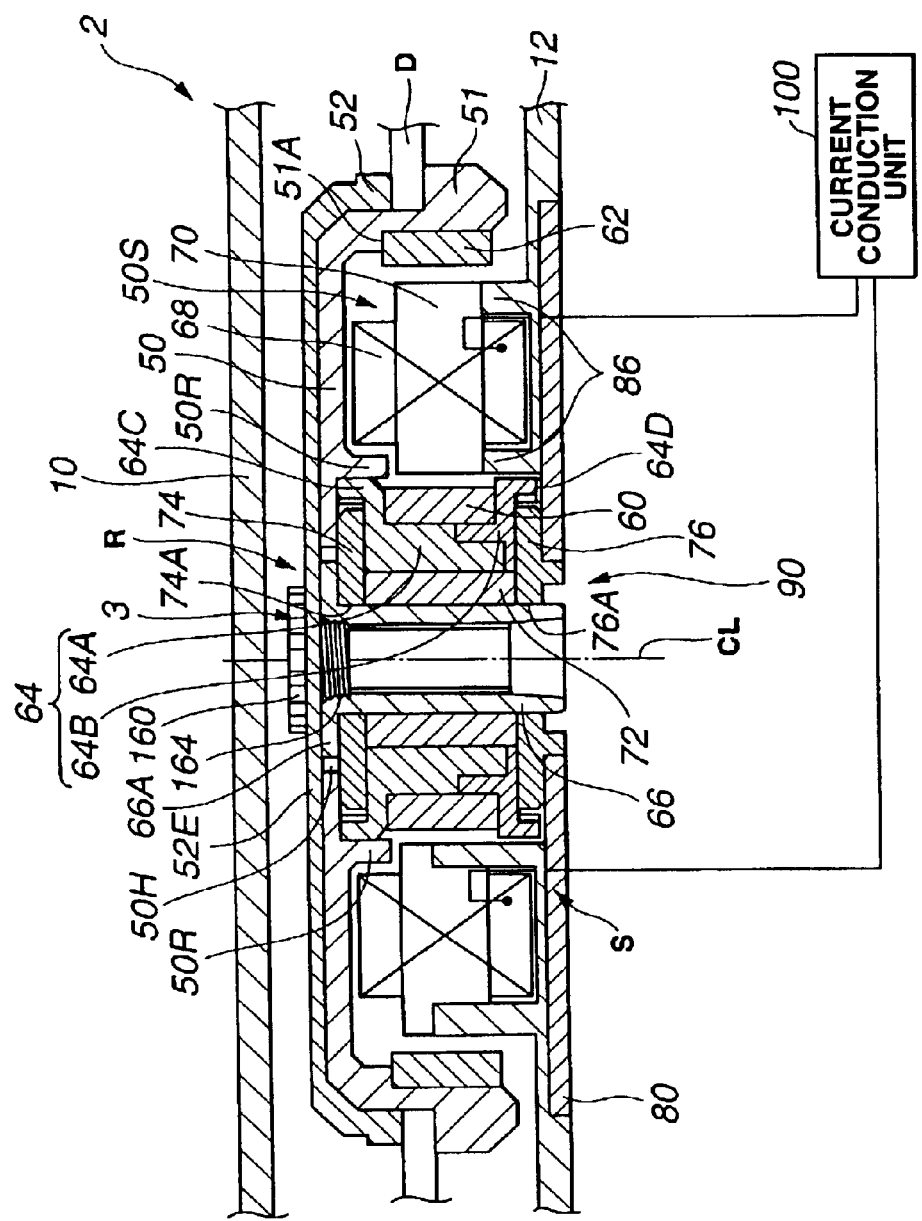
FIG. 11 is a cross-sectional view showing a modification.
Figure 12:
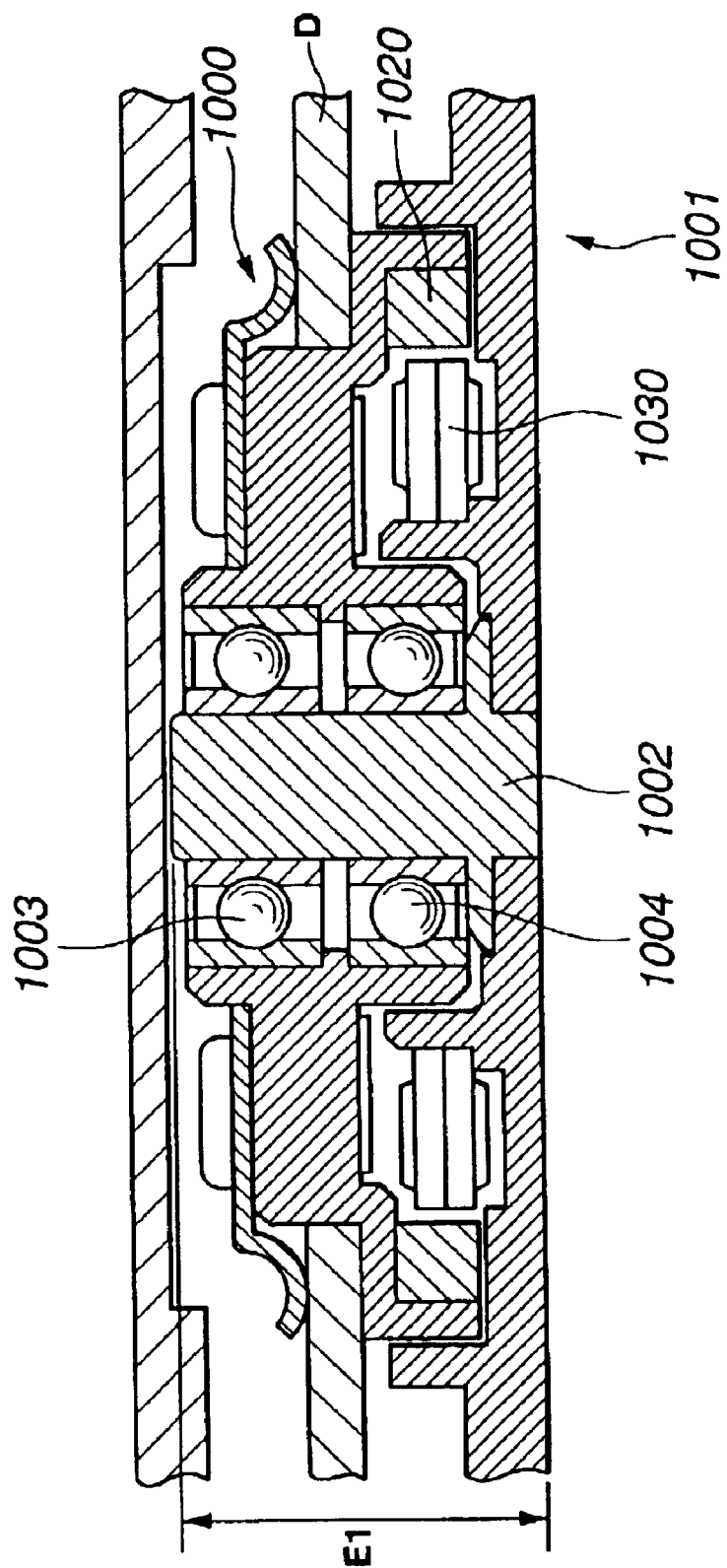
FIG. 12 is a cross-sectional view showing a conventional spindle motor.
Figure 13:
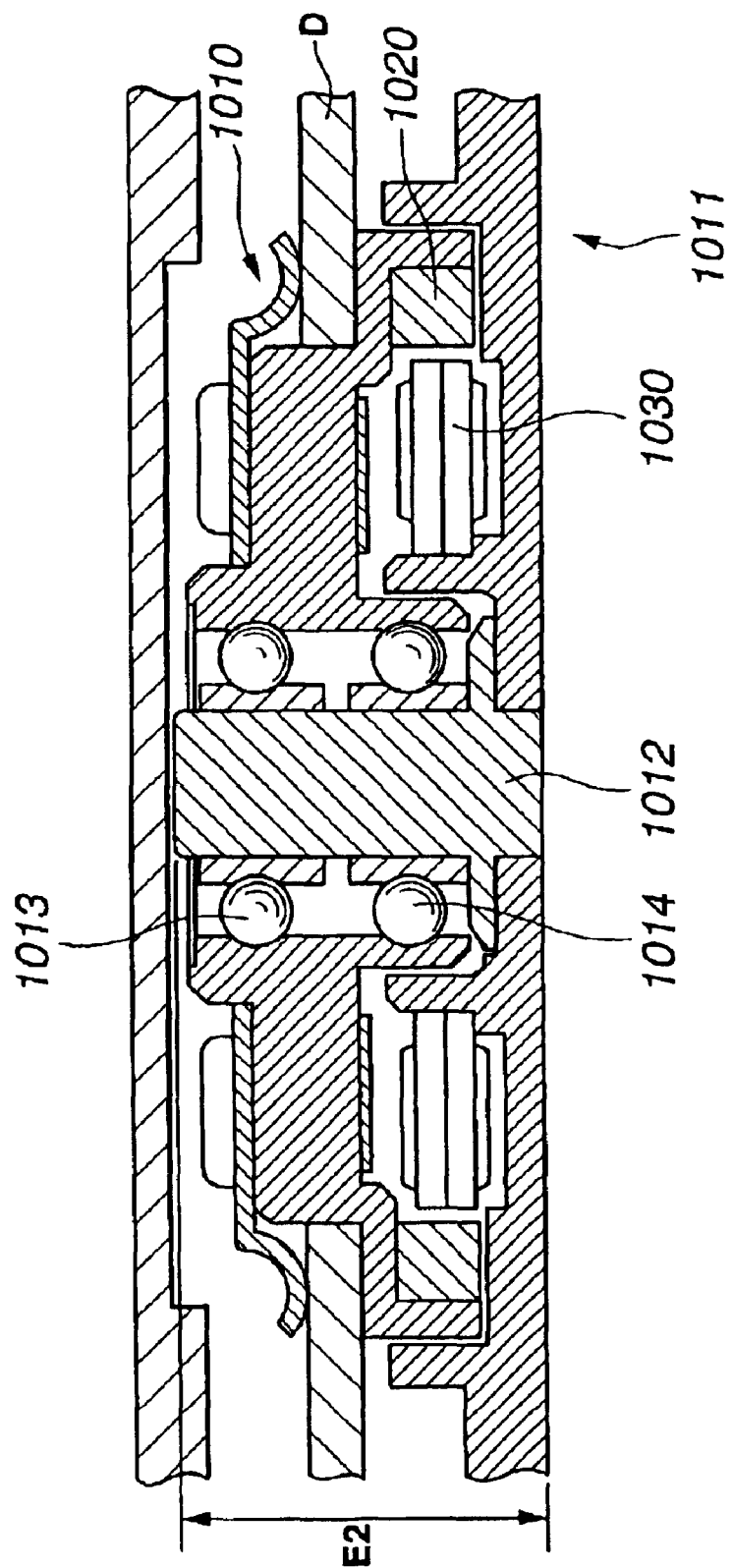
FIG. 13 is a cross-sectional view showing another conventional spindle motor.

FIG. 11 shows a modification of the present invention. The embodiment of FIG. 11 differs from the embodiment of FIG. 5 in the manner of mounting the chuck. The embodiment of FIG. 11 is similar in structure to the embodiment of FIG. 5, except in the manner of mounting the chuck, and hence the same reference numerals as those used in FIG. 5 are used to depict the same or equivalent parts.

In the embodiment of FIG. 5, the chuck 52 is secured to the hub 51. In the embodiment of FIG. 11, the chuck 52 is a disc having a U-shaped cross-section and includes a mounting portion 52E which is removably mounted to a female screw 164 of the fixed shaft 66 by a set screw 160. Thus, by detaching the screw 160 from the female screw 164 of the fixed shaft 66, the chuck 52 may be dismounted to exchange the disc-shaped recording medium with respect to the turntable 50.

The features of the above-described embodiments of the present invention may be summarized as follows:

Referring to FIG. 5, the most outstanding feature is that the first magnet 60 and the second magnet 62, used for rotational driving, are mounted concentrically at a spacing from each other about the center axis CL as center. That is, the first magnet 60 and the second magnet 62 are mounted at a spacing from each other in a direction perpendicular to the center axis CL, viz, the first magnet 60 and the second magnet 62 are not stacked in a direction along the center axis CL. Thus, the length of the spindle motor 3 along the center axis CL can be reduced to as small a value as possible, despite the provision of the first and second magnets 60 and 62.

By arranging the plural first and second magnets 60, 62 in a nested fashion at a spacing from each other, with the respective periphery facing each other, it is possible to improve the rotational torque by a factor of approximately 1.2 to 2.0 as compared to that of a conventional motor in which the magnet is arranged in a facing relationship to a coil.

The result is that the rotational torque of the rotor R can be improved further. That is, such a spindle motor 3 may be produced which is able to develop a high rotational torque even though the spindle motor 3 is diminished in size and thickness along the direction of the center axis CL of the spindle motor 3. Conversely, since a high rotational torque can be produced, the power consumption can be smaller than the case where the same rotational torque is generated with the motor of the conventional structure.

The bearing 90 is not of the conventional ball bearing type and can be reduced in length L along the center axis CL to enable cost reduction. Specifically, the bearing 90 is of a so-called dynamic pressure generating type metal-bearing structure employing the first flange 74, the second sleeve 64, the first flange 74 and the second flange 76, so that it is unnecessary to use balls, and hence the structure may be simplified and reduced in size.

Since the spindle motor 3 may be smaller in length, it may be used with advantage for recording and/or reproducing information signals on or from the one and the outer surfaces of the disc-shaped recording medium D. Since the recording and/or reproduction may be made on both surfaces of the disc-shaped recording medium D, it is possible to accomplish high density magnetic recording to improve the recording capacity.

On the other hand, non-periodic oscillations of the disc-shaped recording medium D can be diminished. Specifically, with the conventional ball-bearing system, there is imposed a limitation in reducing the non-periodic oscillations due to variations in the ball size. With the dynamic pressure-bearing system, in which the rotor performs rotation relative to the shaft, as the rotor is floated in oil, the non-periodic oscillations can be lower by one order of magnitude.

Since the first and second magnets 60, 62 are used to elevate the rotational torque as described above, it is possible to reduce the noise. That is, since the dynamic pressure-bearing system is used, the rotor is floated in oil during its rotation, there is no metal-to-metal contact and hence there is no noise from the bearing, thus reducing the noise. The reason why the low noise may be achieved by elevating the rotational torque is that the magnetic fields cross each other due to the attraction of opposite poles (S and N poles) of the two magnets to improve the magnetic balance.

Since the bearing 90 does not use ball bearings and uses the dynamic pressure-generating type metal bearings, it is possible to improve shock-proofness against external shocks.

Meanwhile, the spindle motor and the information recording and/or reproducing apparatus of the present invention are not limited to the above-described embodiments.

Although the information recording and/or reproducing apparatus is a hard disc driving device in the illustrated embodiments, it may also be an optical disc device or a magneto-optical disc device, in which cases the disc-shaped recording medium d is not the hard disc but is an optical disc or a magnet-optical disc.

What is claimed is:

1. A spindle motor comprising:
    a stator including:
        a stator plate;
        a fixed shaft secured to said stator plate;
        a bearing secured to said fixed shaft; and
        a coil secured to said stator plate about said fixed shaft; and
    a rotor adapted for being rotated relative to said stator, said rotor including:
        a turntable that carries and secures a disc-shaped recording medium and adapted for being rotated relative to said fixed shaft via said bearing;
        a first ring-shaped magnet secured to said turntable and positioned inwardly of said coil about said fixed shaft; and
        a second ring-shared magnet secured to said turntable and positioned outwardly of said coil about said fixed shaft;
    said rotor being rotated relative to said stator about said fixed shaft by a first magnetic field generated in said coil by a current and a second magnetic field produced between said first and second magnets;

wherein said bearing includes a first sleeve secured to the outer peripheral surface of said fixed shaft, a first flange secured to one end of said first sleeve, a second flange secured to the opposite end of said first sleeve, and a second sleeve securing said first magnet to said turntable and said second sleeve kept in contact with said first sleeve, said first flange and said second flange; and wherein herringbone grooves are formed in a surface of said first sleeve that contacts said second sleeve, a surface of said first flange that contacts said second sleeve, and a surface of said second flange that contacts said second sleeve, and wherein oil is applied to a first space between said second sleeve and the surface of the first sleeve, a second space between said second sleeve and the surface of the first flange, and a third space between said second sleeve and the surface of the second flange.

2. The spindle motor according to claim 1 wherein oil-scattering prohibiting means is formed in the second space between the first flange and the second sleeve and in the third space between the second flange and the second sleeve.

3. An information recording and/or reproducing apparatus comprising:

a spindle motor having a stator and a rotor adapted for being rotated relative to said stator, said stator of said spindle motor including:
  a stator plate;
  a fixed shaft secured to said stator plate;
  a bearing secured to said fixed shaft; and
  a coil secured to said stator plate about said fixed shaft;

said rotor including:
  a turntable that carries and secures said disc-shaped recording medium and adapted for being rotated relative to said fixed shaft via said bearing;
  a first ring-shaped magnet secured to said turntable and positioned inwardly of said coil about said fixed shaft; and
  a second ring-shaped magnet secured to said turntable and positioned outwardly of said coil about said fixed shaft as center;

said rotor being rotated relative to said stator about said fixed shaft by a first magnetic field generated in said coil by a current and a second magnetic field produced between said first and second magnets;

wherein said bearing includes a first sleeve secured to the outer peripheral surface of said fixed shaft, a first flange secured to one end of said first sleeve, a second flange secured to the opposite end of said first sleeve and a second sleeve securing said first magnet to said turntable and said second sleeve kept in contact with said first sleeve, said first flange, and said second flange; and wherein herringbone grooves are formed in a surface of said first sleeve that contacts said second sleeve, a surface of said first flange that contacts said second sleeve, and a surface of said second flange that contacts said second sleeve, and wherein oil is applied to a first space between said second sleeve and the surface of the first sleeve, a second space between said second sleeve and the surface of the first flange, and a third space between said second sleeve and the surface of the second flange.

4. The information recording and/or reproducing apparatus including a spindle motor according to claim 3 wherein oil-scattering prohibiting means is formed in the second space between the first flange and the second sleeve and in the third space between the second flange and the second sleeve.

5. The information recording and/or reproducing apparatus including a spindle motor according to claim 3 wherein said stator is secured within a casing of the apparatus and the stator plate forms an integral portion of the casing of the apparatus.

6. The information recording and/or reproducing apparatus including a spindle motor according to claim 3 wherein said disc-shaped recording medium is a hard disc.

* * * * *

UNITED STATES PATENT AND TRADEMARK OFFICE
CERTIFICATE OF CORRECTION

PATENT NO. : 6,922,309 B2
APPLICATION NO. : 10/227432
DATED : June 26, 2005
INVENTOR(S) : Shun Kayama et al.

It is certified that error appears in the above-identified patent and that said Letters Patent is hereby corrected as shown below:

Title Page
The Assignees should read as follows:

(73) Assignee: Sony Corporation (JP); CRD Inc. (JP)

Signed and Sealed this

Twelfth Day of September, 2006

JON W. DUDAS
*Director of the United States Patent and Trademark Office*

UNITED STATES PATENT AND TRADEMARK OFFICE
CERTIFICATE OF CORRECTION

PATENT NO.        : 6,922,309 B2
APPLICATION NO. : 10/227432
DATED             : July 26, 2005
INVENTOR(S)       : Shun Kayama et al.

It is certified that error appears in the above-identified patent and that said Letters Patent is hereby corrected as shown below:

<u>Title Page</u>
The Assignees should read as follows:

(73) Assignee: Sony Corporation (JP); CRD Inc. (JP)

This certificate supersedes Certificate of Correction issued September 12, 2006.

Signed and Sealed this

Seventh Day of November, 2006

JON W. DUDAS
*Director of the United States Patent and Trademark Office*